(12) United States Patent
Chen et al.

(10) Patent No.: US 11,027,503 B2
(45) Date of Patent: Jun. 8, 2021

(54) FIBER REINFORCED POLYMER COMPOSITE MATERIAL AND PREPARATION METHOD THEREOF

(71) Applicant: Covestro Deutschland AG, Leverkusen (DE)

(72) Inventors: James Chen, Shanghai (CN); Zhijiang Li, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 332 days.

(21) Appl. No.: 16/063,086

(22) PCT Filed: Jan. 2, 2017

(86) PCT No.: PCT/EP2017/050025
§ 371 (c)(1),
(2) Date: Jun. 15, 2018

(87) PCT Pub. No.: WO2017/118619
PCT Pub. Date: Jul. 13, 2017

(65) Prior Publication Data
US 2020/0269523 A1      Aug. 27, 2020

(30) Foreign Application Priority Data

Jan. 5, 2016  (CN) .......................... 201610019620.9

(51) Int. Cl.
*B29C 70/08* (2006.01)
*B29C 70/22* (2006.01)
*B29C 70/52* (2006.01)

(52) U.S. Cl.
CPC .......... *B29C 70/086* (2013.01); *B29C 70/226* (2013.01); *B29C 70/521* (2013.01)

(58) Field of Classification Search
CPC ... C08K 7/02; C08K 3/04; C08J 5/047; C08L 2205/16; B29C 70/08; B29C 70/52; B29C 70/521; E21D 20/00
(Continued)

(56) References Cited

U.S. PATENT DOCUMENTS

2015/0291789 A1* 10/2015 Hirata ..................... C08J 5/047
523/468

FOREIGN PATENT DOCUMENTS

CN         1461870      12/2003
EP         0927628 A1    7/1999
(Continued)

OTHER PUBLICATIONS

International Search Report for PCT/EP2017/050025, dated Apr. 20, 2017.
(Continued)

*Primary Examiner* — Camie S Thompson
(74) *Attorney, Agent, or Firm* — K&L Gates LLP

(57) ABSTRACT

The invention relates to a fiber reinforced polymer composite material and a preparation method thereof, wherein the fiber reinforced polymer composite material comprises a polymeric resin matrix in a continuous phase, and chemical fiber fabric and reinforced fibers dispersed in the polymeric resin matrix, and the chemical fiber fabric covers the reinforced fibers so as to avoid exposure of the reinforced fibers to an outside surface of the composite material. The invention reduces or even avoids exposure of the reinforced fibers of the fiber reinforced polymer composite material, and can be used for manufacturing cable bridges, frames of doors, windows and curtain walls, etc. The method for preparing the fiber reinforced polymer composite material of the invention effectively improves the performance of the com-
(Continued)

posite material and also reduces the cost of surface treatment and increases production efficiency.

11 Claims, 1 Drawing Sheet

(58) Field of Classification Search
USPC .................................................... 428/300.4
See application file for complete search history.

(56) References Cited

FOREIGN PATENT DOCUMENTS

| EP | 2937377 A1 | | 10/2015 |
|----|------------|---|---------|
| JP | H11-200798 | * | 7/1999 |
| JP | H11200798 | | 7/1999 |
| WO | 0240755 A2 | | 5/2002 |

OTHER PUBLICATIONS

Written Opinion of the International Searching Authority for PCT/EP2017/050025, dated Apr. 20, 2017.

* cited by examiner

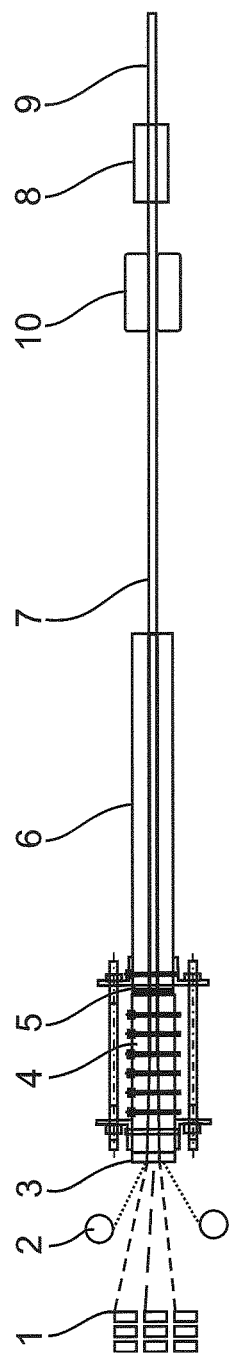

FIBER REINFORCED POLYMER COMPOSITE MATERIAL AND PREPARATION METHOD THEREOF

CROSS-REFERENCE TO RELATED APPLICATIONS

This application is a U.S. national stage application, filed under 35 U.S.C. § 371, of International Application No. PCT/EP2017/050025, which was filed on Jan. 2, 2017, and which claims priority to Chinese Patent Application No. 201610019620.9, which was filed on Jan. 5, 2016, the contents of each are incorporated by reference into this specification.

FIELD OF THE INVENTION

The invention relates to a composite material and a preparation method thereof, and particularly relates to a fiber reinforced polymer composite material and a preparation method thereof.

BACKGROUND OF THE INVENTION

A pultrusion process and a continuous plate production process are widely used processes for continuously producing composite materials. The pultrusion process is a process in which continuous reinforced fibers impregnated with matrix resin and combined with the matrix resin as a whole in a die cavity due to curing or hardening of the matrix resin are continuously drawn out of the die cavity using a clamping platform alternately moving or a crawler belt continuously moving along a central axis of the die cavity, thus producing a fiber reinforced composite material product.

The continuous plate process is a process in which reinforced fibers are fully impregnated with resin or resin paste between two thin films continuously moving forward, and the resin or resin paste is cured or hardened at a certain temperature such that the reinforced fibers are combined with matrix resin as a whole to form a continuous plate or sheet.

The reinforced fibers commonly used in the composite material described above are selected from glass fiber, carbon fiber, Kevlar fiber, basalt fiber, natural fabric fiber, etc., wherein glass fiber is most frequently used. The composite material described above, especially the pultruded composite material, has both the advantages of high fiber content, good mechanical performance, high production automation and the like, and the disadvantages of low transverse strength, exposure of reinforced fibers to a surface of the composite material due to abrasion and aging, etc.

To overcome the above disadvantages, a method widely used in industry is that fibrofelt is used to enhance transverse performance and polymeric fiber surface felt is used to protect reinforced fibers, thus preventing the fibers from exposing to a surface of the composite material. The fibrofelt herein refers to a felty sheet or web prepared from continuous or chopped fibers uniformly distributed and combined together by stitching, needle punching or non-woven bonding. The polymeric fiber surface felt herein refers to a flake prepared by bonding polymeric staple fibers using a pulping and settling method. The polymeric fiber most commonly used in industry is selected from polyester fiber and nylon fiber, wherein the fiber having a grammage of less than 80 g/m² is most commonly used.

In practical applications, fibrofelt has the disadvantages of insufficient tensile strength, being easily stretch broken, un-uniform thickness, and being susceptible to fiber hairiness stacking and folding difficulty in preforming after cutting. Polyester fiber surface felt and nylon fiber surface felt have the disadvantages of high cost, low production efficiency, exposure and fly-away of polyester fiber after aging resulting from fiber discontinuity, limited anti-aging effects, etc. A composite material in which exposure of reinforced fibers is reduced or even avoided and a suitable preparation method have been always required in the art.

SUMMARY OF THE INVENTION

A technical problem to be solved by the invention is to provide a composite material in which exposure of reinforced fibers is reduced.

The technical problem to be solved by the invention can be solved by the following technical solution.

A first aspect of the invention provides a fiber reinforced polymer composite material, which is characterized in that:

a. the fiber reinforced polymer composite material comprises a polymeric resin matrix in a continuous phase, and chemical fiber fabric and reinforced fibers dispersed in the polymeric resin matrix, and the chemical fiber fabric covers the reinforced fibers so as to avoid exposure of the reinforced fibers to an outside surface of the composite material;

b. the chemical fiber fabric is prepared from continuous chemical fibers and has a grammage in the range of 10-1800 g/m², preferably 10-1200 g/m², and most preferably 10-100 g/m²; and c. the fiber reinforced polymer composite material is prepared by a pultrusion process or a continuous laminate process.

A second aspect of the invention provides a method for preparing the fiber reinforced polymer composite material, the method comprising the steps of:

i) covering reinforced fibers with chemical fiber fabric;

ii) impregnating the chemical fiber fabric and the reinforced fibers with liquid polymeric resin;

iii) curing or hardening the resin so that the resin is combined with the chemical fiber fabric and the reinforced fibers as a whole to obtain the composite material; and iv) continuously molding the composite material using a pultrusion process or a continuous laminate process.

A third aspect of the invention provides an article prepared from the fiber reinforced polymer composite material.

Exposure of the reinforced fibers of the fiber reinforced polymer composite material of the invention is reduced or even avoided, and the composite material can be used for manufacturing cable bridges, frames of doors, windows and curtain walls, etc.

The method for preparing the fiber reinforced polymer composite material of the invention effectively improves the performance of the composite material and also reduces the cost of surface treatment and increases production efficiency.

BRIEF DESCRIPTION OF THE DRAWINGS

FIG. 1 shows an example of a process for preparing the fiber reinforced polymer composite material of the invention, wherein:

1 represents glass fiber yarns; 2 represents glass fiber stitch-bonded felt; 3 represents glue injection box inlet plate; 4 represents glue injection box; 5 represents glue injection box outlet plate; 6 represents die; 7 represents flat plate; 8 represents clamping platform traction device; 9 represents flat plate; and 10 represents clamping platform traction device.

DETAILED DESCRIPTION OF THE INVENTION

The present application provides the following embodiments:

Embodiment 1: a fiber reinforced polymer composite material, characterized in that:

a. the fiber reinforced polymer composite material comprises a polymeric resin matrix in a continuous phase, and chemical fiber fabric and reinforced fibers dispersed in the polymeric resin matrix, and the chemical fiber fabric covers the reinforced fibers so as to avoid exposure of the reinforced fibers to an outside surface of the composite material;

b. the chemical fiber fabric is prepared from continuous chemical fibers and has a grammage in the range of 10-1800 g/m$^2$, preferably 10-1200 g/m$^2$, and most preferably 10-100 g/m$^2$; and c. the fiber reinforced polymer composite material is prepared by a pultrusion process or a continuous laminate process.

Embodiment 2: the fiber reinforced polymer composite material according to Embodiment 1, characterized in that: the chemical fiber fabric is selected from the group consisting of poly(ethylene terephthalate) fiber (e.g., DACRON®), nylon (polyamide fiber), vinylon (polyvinyl formal fiber), PVC fiber (polyvinyl chloride fiber), acrylon (acrylic fiber), spandex (thermoplastic polyurethane fiber), polyolefin fiber, regenerated cellulose fiber, polynosic fiber fabric, and a composite fiber fabric comprising a combination of any thereof.

Embodiment 3: the fiber reinforced polymer composite material according to Embodiment 1 or 2, characterized in that: the chemical fiber fabric is selected from the group consisting of plain cloth, twill and sateen prepared from continuous fibers by a weaving method; or fabric prepared by a knitting method; or fabric directly prepared by a stitchbonding method.

Embodiment 4: the fiber reinforced polymer composite material according to any one of Embodiments 1-3, characterized in that: a fiber surface of the chemical fiber fabric is adhered by one or more additives selected from the group consisting of an ultraviolet stabilizer, a release agent, a flame retardant, a conductivity improver, a film forming agent and a pigment.

Embodiment 5: the fiber reinforced polymer composite material according to any one of Embodiments 1-4, characterized in that: the polymeric resin is thermosetting resin or thermoplastic resin.

Embodiment 6: the fiber reinforced polymer composite material according to any one of the Embodiments 1-5, characterized in that: the reinforced fibers are selected from the group consisting of glass fiber, carbon fiber, Kevlar fiber, basalt fiber and natural fabric fiber.

Embodiment 7: a method for preparing the fiber reinforced polymer composite material according to any one of Embodiments 1-6, the method comprising the steps of:

i) covering reinforced fibers with chemical fiber fabric;

ii) impregnating the chemical fiber fabric and the reinforced fibers with liquid polymeric resin;

iii) subjecting the resin to curing or cold hardening so that the resin is combined with the chemical fiber fabric and the reinforced fibers as a whole to obtain the composite material; and iv) continuously molding the composite material using a pultrusion process or a continuous laminate process.

Embodiment 8: the method according to Embodiment 7, characterized in that: the curing or hardening temperature ranges from −5° C. to 250° C., preferably 5-220° C., and still further preferably 50-200° C.

Embodiment 9: the method according to Embodiment 7 or 8, characterized in that: the pressure for impregnating the fibers with the resin is 1-100 bar, preferably 1-30 bar, and still further preferably 1-20 bar.

Embodiment 10: an article prepared from the fiber reinforced polymer composite material according to any one of Embodiments 1-6.

Embodiment 11: the article according to Embodiment 10, characterized in that: the article is selected from the group consisting of: cable bridges, frames of doors, windows and curtain walls, frames of ladders, tent poles or pipes, antiglare shields, floors, sucker rods, telegraph poles and cross arms, guardrails, gratings, architectural sectional materials, container sectional materials and plates, bike racks, fishing rods, cable cores, insulator core rods, radomes, single-layer or sandwiched continuous plates, etc.

An ultraviolet stabilizer may be added by infiltrating chemical fibers before weaving or chemical fiber fabric after weaving with a solution containing an ultraviolet stabilizer and then conducting oven-drying or air-drying, thereby improving the aging resistance of polymeric resin infiltrated on a surface of the chemical fiber fabric and the aging resistance of the chemical fiber fabric.

The ultraviolet stabilizer is evenly dispersed or dissolved by water or a solution formulated from one or more solvents selected from the group consisting of: acetone, ethyl acetate, ethanol, ethylene glycol, toluene, xylene, benzene, anisole, carbon tetrachloride, chlorobenzene, cyclohexane, butyl ether, dichloroethane, 1,2-dimethoxyethane, N,N-dimethylacetamide, N,N-dimethylformamide, dimethyl sulfoxide, 1,4-dioxane, ethyl benzoate, formamide, isopropanol, isopropyl ether, methanol, pyridine, tertbutyl alcohol and tetrahydrofuran. Preferably, the ultraviolet stabilizer is adhered on a surface of chemical fibers or chemical fiber fabric.

The ultraviolet stabilizer includes but is not limited to: ultraviolet absorbers such as salicylate esters, 2-hydroxybenzophenone, 2-hydroxybenzotriazole, 2-hydroxy s-triazine, substituted acrylonitrile and hindered amines; ultraviolet shielding agents such as carbon black and titanium dioxide white powder; and quenchers such as nickel compounds.

The ultraviolet stabilizer is present in an amount of 0.05%-10%, preferably 0.1-8% and more preferably 0.1-5% in the chemical fiber fabric based on the total weight of the chemical fiber fabric.

A release agent may be added by a method similar to that described for the ultraviolet stabilizer so as to be adhered on a surface of chemical fibers or chemical fiber fabric. Surfaces of the chemical fiber fabric may be fully coated with the release agent or one surface thereof that is close to a surface of a die cavity is coated only so that the other surface can be closely bonded with a resin matrix. In a pultrusion process, a release agent helps reduce the adhesive force and the friction force between a composite material in a gel state and a cured state in a die and a surface of the die, thereby reducing the tractive force during pultrusion.

The release agent includes but is not limited to: external release agents such as silicon-based, wax-based, grease, fluorine-based and surfactant release agents; and internal release agents such as hydroxy acid-modified polysiloxane, amino-modified polysiloxane and polyether-modified polysiloxane.

The release agent is present in an amount of 0.5%-10%, preferably 0.5-8% and more preferably 0.5-5% in the chemical fiber fabric based on the total weight of the chemical fiber fabric.

A flame retardant may be added by a method similar to that described for the ultraviolet stabilizer so as to be adhered on a surface of chemical fibers or chemical fiber fabric, thereby improving the flame retardancy of the composite material.

The flame retardant includes: reactive and additive flame retardants, including but not limited to glycol bis(2-chloroethyl)phosphate, tris(polyoxyalkylene)phosphate, tris(polyoxyalkylene)phosphite, tris(dipropylene glycol)phosphite, red phosphorus, expanded graphite, decabromodiphenyl oxide, diantimony trioxide, tris(2-chloroethyl)phosphate (TCEP), tris(2-chloropropyl)phosphate (TCPP), tris(1,3-dichloro-2-propyl)phosphate (TDCPP), dimethyl methyl phosphonate (DMMP), triphenyl phosphate, melamine polyphosphate (MPP), and the like, or mixtures thereof; and inorganic flame retardants, including but not limited to expandable silicate hydrate, hydrated aluminum hydroxide, hydrated magnesium hydroxide, monoammonium phosphate, diammonium phosphate, ammonium chloride, boric acid, hydrated zinc borate (FB), and the like, or mixtures thereof.

The flame retardant is present in an amount of 5%-1000% with respect to the weight of the chemical fiber fabric.

A conductivity improver may be added by a method similar to that described for the ultraviolet stabilizer so as to be adhered on a surface of chemical fibers or chemical fiber fabric, thereby improving the electrical conductivity of the composite material.

The conductivity improver includes but is not limited to carbon black, metal powder, etc.

The conductivity improver is present in an amount of 0.5%-20% in the chemical fiber fabric based on the total weight of the polymeric fiber fabric.

A film forming agent may be either added by a method similar to that described for the ultraviolet stabilizer, or used alone, or used together with the above additives or other functional auxiliary agents so as to be adhered on a surface of chemical fibers or chemical fiber fabric, thereby protecting the chemical fibers, reducing the damage caused by external factors such as ultraviolet rays, corrosion and abrasion to the chemical fibers and the fabric thereof, and fixing the above additives or other auxiliary agents to the surface of the chemical fibers.

The film forming agent includes but is not limited to polyester resin, epoxy resin, polyvinyl alcohol, polyurethane, starch, fluorocarbon resin, acrylic resin, alkyd resin, melamine resin, furan resin, phenolic resin, silicone resin and inorganic resin. Preferred is light and weather resistant resin or corrosion-resistant resin or fire retardant coating, e.g. aliphatic polyurethane resin, acrylic resin, fluorocarbon resin, organosilicone resin, silicate coating, furan resin, phenolic resin and intumescent flame retardant coating.

The film forming agent is present in an amount of 2-1000% with respect to the weight of the chemical fiber fabric.

A pigment may be added by a method similar to that described for the ultraviolet stabilizer so as to be adhered on a surface of chemical fibers or chemical fiber fabric, thereby subjecting the composite material to surface finishing.

The pigment includes but is not limited to inorganic pigment powder and paste thereof as well as organic pigment and paste thereof.

The pigment is present in an amount of 0.1-10% in the chemical fiber fabric based on the total weight of the chemical fiber fabric.

The chemical fiber fabric may also comprise other functional auxiliary agents (e.g. lubricants and dyes) commonly used in the art.

Optionally, the chemical fiber fabric is compounded with other kinds of fibers or fabrics or thin films during or after weaving to achieve the purpose of having multiple functions. Said other kinds of fibers or fabrics or thin films include but are not limited to glass fiber, carbon fiber, polymeric fiber, natural fiber, cloth weaved from these fibers or non-weaved felt made therefrom, thin films made from various polymers, etc.

The thermosetting resin includes but is not limited to thermosetting polyurethane, unsaturated polyester resin, vinyl resin, epoxy resin, phenolic resin, cyanate resin and melamine resin.

The thermoplastic resin includes but is not limited to thermoplastic polyurethane, polyamide resin, polypropylene, polyvinyl chloride, polyethylene, polyethylene terephthalate and polycarbonate.

Preferably, the polymeric resin is thermosetting polyurethane. Preferably, the thermosetting polyurethane is aromatic polyurethane resin, e.g. Baydur 18BD106 polyurethane material for a pultrusion system produced by Covestro Deutschland AG.

The thermosetting polyurethane may be a bi-component polyurethane resin comprising an isocyanate component and a polyol component, wherein the isocyanate component is a diphenylmethane diisocyanate monomer, prepolymer, or oligomer, or a combination thereof, or a toluene diisocynate prepolymer, or oligomer, or a combination thereof, and has a viscosity of 20-3000 mPa·s, a functionality of 2-4, and an NCO % of 5-38%; and the polyol component has a hydroxyl value of 50-800 mg KOH and a viscosity of 50-3000 mPa·s. For example, the isocyanate component may be Desmodur 1511L (modified diphenylmethane diisocyanate, NCO %: 32%, viscosity: 200 mPa.$) from Covestro Deutschland AG. The polyol component may be Baydur Pu12500 Component B (hydroxyl value: 415 mg KOH/g, viscosity: 750 mPa.$) from Covestro Deutschland AG.

During the preparation of the fiber reinforced polymer composite material of the invention, the polymeric resin is combined with the chemical fiber fabric and the reinforced fibers in a die or between two thin films and then cured to a desired shape.

During the preparation of the fiber reinforced polymer composite material of the invention, the fibers impregnated with resin are extruded using an airtight resin box or a clamping roll so that the chemical fiber fabric and the reinforced fibers are fully impregnated with the polymeric resin therein.

In a particular embodiment, polyester fiber plain cloth treated with a processing agent containing an ultraviolet stabilizer is used to cover glass fiber yarns for reinforcing polyurethane resin in a pultrusion process to obtain a composite material, thereby slowing down the exposure of glass fiber in a working environment such as aging, corrosion and abrasion, and alleviating the problem that polyester fiber surface felt currently used in industry is easily stretch broken during molding.

EXAMPLES

Some of a plurality of possible examples of the invention will be introduced below to provide a basic understanding of the invention. It is not intended to confirm the key or decisive elements of the invention or to define the claimed scope. The following raw materials, equipment and test methods are employed in the examples of the invention.

| Name of raw materials | Specification/ brand | Supplier |
| --- | --- | --- |
| Modified diphenyl- methane diisocyanate | Desmodur1511L | Bayer Material Science (China) Co., Ltd. |
| Polyol | Baydur PUL2500 Component B | Bayer Material Science (China) Co., Ltd. |
| Internal release agent | Baydur 18BD101 | Covestro Deutschland AG |
| Polyester plain cloth | Dacron anti- corrosion grey cloth: 40 g/m$^2$; 130 g/m$^2$; 300 g/m$^2$ | Jizhou Tianhe Weaving Factory |
| Glass fiber yarns | ECT 469P-2400, 2400 tex | Chongqing Polycomp International Corp. |
| Glass fiber stitch-bonded felt | EMK-300; grammage: 300 g/m$^2$ | Chongqing Polycomp International Corp. |
| Ultraviolet stabilizer | ZIKA-CUV | ZIKO LTD |
| Pigment paste | Yellow green | BOMEX |
| Pultrusion equipment | 10 t hydraulic pultrusion machine | Nanjing Loyalty Composite Equipment Manufacture Co., Ltd. |
| Glue injection machine | Hydraulic Mini Link System | Magnum Venus Products |

1800 hours accelerated aging test method: test standard: ASTM G154 Cycle 1. The method is specifically described as follows:

The raw materials are subjected to irradiation exposure for 8 hour at a black standard temperature of 60° C.±3° C. using a light source UVA-340 having a typical illumination intensity of 0.89 W/m$^2$/nm and a typical optical wavelength of 340 nm, and then non-irradiation condensation exposure for 4 hours at a black standard temperature of 50° C.±3° C.

Example 1 (the Prior Art)

With reference to FIG. 1, 194 glass fiber yarns 1 and glass fiber stitch-bonded felt 2 (an upper layer and a lower layer, symmetrically arranged up and down relative to the glass fiber yarns 1) were introduced out of a yarn creel, passed through a three-stage yarn guide plate, entered a glue injection box 4 via a glue injection box inlet plate 3, left the glue injection box 4 via a glue injection box outlet plate 5, and passed through a die 6; and the glass fiber yarns 1 and the glass fiber stitch-bonded felt 2 passing through the die 6 were firmly bound by a traction rope, then front and rear clamping platform traction devices 10 and 8 were started, the traction devices were pulled forward until all the yarns were pulled straight, the die temperature was sequentially controlled at 40° C./60° C./190° C./170° C. from an inlet to an outlet, a glue injection machine (not shown) was started to continuously pump a component A (Desmodur1511L) and a component B (100 parts of BaydurPUL2500 COMPONENT B: 4 parts of Baydur18BD101) in a weight ratio of 114:100 to a static mixing head (not shown), the components were mixed by the mixing head, then filled up the glue injection box 4 and fully impregnated the fiber yarns 1 and the glass fiber stitch-bonded felt 2, and the glue injection pressure in the glue injection box 4 was controlled at 3-15 bar. The fiber yarns impregnated by the glue injection box 4 were continuously pulled through the die 6 by the clamping platform traction devices 10 and 8 and cured by the heated die 6 to become flat plates 7 and 9 which were then continuously pulled out of the die 6, wherein the traction speed was 0.4 m/min and the tractive force (KN) could be read on an instrument panel of a pultrusion machine (the results were listed in Table 1). The flat plates were cut to 500 mm sample segments by an online cutting device, then the sample segments were cut to 100 mm×50 mm composite material test sample plates by a CNC cutter and subjected to aging test, and the exposure of glass fiber on surfaces of the samples was visually observed.

Example 2 (the Invention)

The procedure of Example 1 was repeated except that a piece of 40 g/m$^2$ polyester plain cloth was covered on an upper layer of glass fiber stitch-bonded felt 2 to pass through a glue injection box 4 and a die 6 together with glass fiber 1 and the glass fiber stitch-bonded felt 2 and then cured to a flat plate with polyester cloth.

Example 3 (the Invention)

The procedure of Example 1 was repeated except that a layer of 130 g/m$^2$ polyester plain cloth instead of an upper layer of glass fiber stitch-bonded felt 2 was covered on glass fiber 1 to pass through a glue injection box 4 and a die 6 together with the glass fiber 1 and a lower layer of the glass fiber stitch-bonded felt 2 and then cured to a flat plate with polyester cloth.

Example 4 (the Invention)

The procedure of Example 1 was repeated except that a layer of 300 g/m$^2$ polyester plain cloth instead of an upper layer of glass fiber stitch-bonded felt 2 was covered on an upper layer of glass fiber 1 to pass through a glue injection box 4 and a die 6 together with the glass fiber 1 and a lower layer of the glass fiber stitch-bonded felt 2 and then cured to a flat plate with polyester cloth.

Example 5 (the Invention)

The procedure of Example 1 was repeated except that ZIKA-CUV in a weight ratio of 10:100 was dissolved in ethanol to obtain a solution, a roll of 40 g/m$^2$ polyester plain cloth was impregnated with the solution, the weight ratio of dry polyester cloth to wet polyester cloth was controlled at 1:2, then the wetted polyester plain cloth was placed in a 40° C. oven to evaporate off ethanol, and a layer of 40 g/m$^2$ oven-dried polyester plain cloth was covered on an upper layer of glass fiber stitch-bonded felt 2 to pass through a glue injection box 4 and a die 6 together with glass fiber 1 and the glass fiber stitch-bonded felt 2 and then cured to a flat plate with polyester cloth.

Example 6 (the Invention)

The procedure of Example 1 was repeated except that ZIKA-CUV and an internal release agent Baydur18BD101 in a weight ratio of 10:10:100 were dissolved in ethanol to obtain a solution, a roll of 40 g/m$^2$ polyester plain cloth was impregnated with the solution, the weight ratio of dry polyester cloth to wet polyester cloth was controlled at 1:2, then the wetted polyester plain cloth was placed in a 40° C. oven to evaporate off ethanol, and a layer of 40 g/m$^2$ oven-dried polyester plain cloth was covered on an upper layer of glass fiber stitch-bonded felt 2 to pass through a glue injection box 4 and a die 6 together with glass fiber 1 and the glass fiber stitch-bonded felt 2 and then cured to a flat plate with polyester cloth.

Example 7 (the Invention)

The procedure of Example 1 was repeated except that ZIKA-CUV, an internal release agent and BOMEX pigment paste Baydur18BD101 in a weight ratio of 10:10:10:100 were dissolved in ethanol to obtain a solution, a roll of 40 g/m² polyester plain cloth was impregnated with the solution, the weight ratio of dry polyester cloth to wet polyester cloth was controlled at 1:2, then the wetted polyester plain cloth was placed in a 40° C. oven to evaporate off ethanol, and a layer of 40 g/m² oven-dried polyester plain cloth was covered on an upper layer of glass fiber stitch-bonded felt 2 to pass through a glue injection box 4 and a die 6 together with glass fiber 1 and the glass fiber stitch-bonded felt 2 and then cured to a flat plate with polyester cloth.

Example 8 (the Invention)

The procedure of Example 1 was repeated except that ZIKA-CUV, an internal release agent Baydur18BD101 and coated red phosphorus having a phosphorus content of 90% in a weight ratio of 10:10:20:100 were dissolved in ethanol to obtain a solution paste, a roll of 40 g/m² polyester plain cloth was impregnated with the solution paste, the weight ratio of dry polyester cloth to wet polyester cloth was controlled at 1:2, then the wetted polyester plain cloth was placed in a 40° C. oven to evaporate off ethanol, and a layer of 40 g/m² oven-dried polyester plain cloth was covered on an upper layer of glass fiber stitch-bonded felt 2 to pass through a glue injection box 4 and a die 6 together with glass fiber 1 and the glass fiber stitch-bonded felt 2 and then cured to a flat plate with polyester cloth.

Example 9 (the Invention)

The procedure of Example 1 was repeated except that ZIKA-CUV, white aqueous fluorocarbon paint FC-W200 (formulated from two components in a ratio of 10:1 and produced by Shanghai Hengfeng Fluorocarbon Materials Co., Ltd.) and water in a weight ratio of 10:20:100 were prepared into a solution, a roll of 40 g/m² polyester plain cloth was impregnated with the solution paste, the weight ratio of dry polyester cloth to wet polyester cloth was controlled at 1:2, then the wetted polyester plain cloth was placed in a 40° C. oven to evaporate off water, and a layer of 40 g/m² oven-dried polyester plain cloth was covered on an upper layer of glass fiber stitch-bonded felt 2 to pass through a glue injection box 4 and a die 6 together with glass fiber 1 and the glass fiber stitch-bonded felt 2 and then cured to a flat plate with polyester cloth.

Example 10 (the Invention)

The procedure of Example 1 was repeated except that PHA-SW coating (outdoor thick-coated intumescent fire retardant coating, produced by Shanghai Pinghai Paint Co., Ltd.) and water in a weight ratio of 90:100 were formulated into a viscous liquid, the liquid was knife-coated on two rolls of 130 g/m² polyester plain cloth, the weight ratio of dry polyester cloth to wet polyester cloth was controlled at 1:3, then the wetted polyester plain cloth was placed in a 40° C. oven to evaporate off water, the glass fiber stitch-bonded felt 2 in Example 1 was removed, and two layers of 130 g/m² oven-dried polyester plain cloth were respectively covered on upper and lower surfaces of glass fiber 1 to pass through a glue injection box 4 and a die 6 together with the glass fiber 1 and then cured to a flat plate with polyester cloth.

The composite materials prepared (surfaces on which the upper layers in the above examples were located) were observed and tested, wherein the observed and test results were listed in Table 1.

TABLE 1

Observed and test results of the resulting composite materials

| Examples | Tractive force during pultrusion (KN) | Surface flatness | After 1800 hours accelerated aging Visualized exposure state of glass fiber |
|---|---|---|---|
| 1 | 25 | Flat | Obvious glass fiber exposure |
| 2 | 26 | No obvious bending | No glass fiber exposure. The surface showed that the polyester cloth whitened. |
| 3 | 29 | Obvious bending | No glass fiber exposure. The surface showed that the polyester cloth whitened. |
| 4 | 34 | Obvious bending | No glass fiber exposure. The surface showed that the polyester cloth whitened. |
| 5 | 27 | No obvious bending | No glass fiber exposure. The surface showed that the polyester cloth whitened not obviously. |
| 6 | 22 | No obvious bending | No glass fiber exposure. The surface showed that the polyester cloth whitened not obviously. |
| 7 | 2.1 | No obvious bending | No glass fiber exposure. The surface was uniformly yellow green and the polyester cloth whitened not obviously. |
| 8 | 23 | No obvious bending | No glass fiber exposure. The surface was dark red and the polyester cloth whitened not obviously. |
| 9 | 24 | No obvious bending | No fiber exposure. The polyester cloth whitened not obviously. |
| 10 | 33 | No obvious bending | No glass fiber exposure and polyester cloth whitening |

The results show that the addition of polyester plain cloth significantly reduces the exposure of glass fiber and significantly improves the aging resistance of the composite material, the addition of an ultraviolet stabilizer for treating polyester cloth further alleviates the whitening of polyester cloth, the addition of an internal release agent for treating polyester cloth significantly reduces the tractive force during pultrusion, the addition of pigment paste for treating polyester cloth achieves uniform surface finishing, and the addition of red phosphorus for treating polyester cloth and the treatment of polyester cloth with fire retardant coating improve the flame retardancy of the composite material. Meanwhile, it is also found that use of a single surface of 40 g/m² polyester cloth does not affect the surface flatness of a pultruded sectional material and increase the tractive force during pultrusion while use of a single surface of polyester cloth of more than 130 g/m² will make the product deform.

Optional embodiments of the invention have been described above with reference to FIG. 1 to teach those skilled in the art how to implement and reproduce the invention. To teach the technical solutions of the invention, some conventional aspects have been simplified or omitted. Those skilled in the art should understand that variations or replacements derived from these embodiments will fall within the scope of the invention.

The invention claimed is:

1. A fiber reinforced polymer composite material, wherein:
   a. the fiber reinforced polymer composite material comprises a polymeric resin matrix in a continuous phase, and chemical fiber fabric and reinforced fibers dispersed in the polymeric resin matrix, and the chemical fiber fabric covers the reinforced fibers so as to avoid exposure of the reinforced fibers to an outside surface of the composite material;
   b. the chemical fiber fabric is selected from the group consisting of plain cloth, twill, and sateen prepared from continuous fibers by a weaving method; or fabric prepared by a knitting method; or fabric directly prepared by a stitchbonding method and has a grammage in the range of 10-1800 $g/m^2$; and
   c. the fiber reinforced polymer composite material is prepared by a pultrusion process or a continuous laminate process.

2. The fiber reinforced polymer composite material according to claim 1, wherein the chemical fiber fabric is selected from the group consisting of poly(ethylene terephthalate) fiber, nylon, vinylon, polyvinyl chloride fiber, acrylic fiber, spandex, polyolefin fiber, regenerated cellulose fiber, polynosic fiber fabric, and composite fiber fabric comprising a combination of any thereof.

3. The fiber reinforced polymer composite material according to claim 1, wherein a fiber surface of the chemical fiber fabric is adhered by one or more additives selected from the group consisting of an ultraviolet stabilizer, a release agent, a flame retardant, a conductivity improver, a film forming agent and a pigment.

4. The fiber reinforced polymer composite material according to claim 1, wherein a fiber surface of the chemical fiber fabric is adhered by a light and aging resistant resin coating or an anti-corrosion resin coating or a fire retardant coating selected from the group consisting of aliphatic polyurethane resin, acrylic resin, fluorocarbon resin, organo-silicone resin, silicate coating, furan resin, phenolic resin and intumescent flame retardant coating.

5. The fiber reinforced polymer composite material according to claim 1, wherein the polymeric resin is thermosetting resin or thermoplastic resin.

6. The fiber reinforced polymer composite material according to claim 1, wherein the reinforced fibers are selected from the group consisting of glass fiber, carbon fiber, Kevlar fiber, basalt fiber and natural fabric fiber.

7. A method for preparing the fiber reinforced polymer composite material according to claim 1, the method comprising:
   i) covering reinforced fibers with chemical fiber fabric selected from the group consisting of plain cloth, twill, and sateen prepared from continuous fibers by a weaving method; or fabric prepared by a knitting method; or fabric directly prepared by a stitchbonding method;
   ii) impregnating the chemical fiber fabric and the reinforced fibers with liquid polymeric resin;
   iii) curing or hardening the resin so that the resin is combined with the chemical fiber fabric and the reinforced fibers as a whole to obtain the composite material; and
   iv) continuously molding the composite material using a pultrusion process or a continuous laminate process.

8. The method according to claim 7, wherein the curing or hardening temperature ranges from −5° C. to 250° C.

9. The method according to claim 7, wherein the pressure for impregnating the chemical fiber fabric and the reinforced fibers with the resin is 1-100 bar.

10. An article prepared from the fiber reinforced polymer composite material according to claim 1.

11. The article according to claim 10, wherein the article is selected from the group consisting of: cable bridges, frames of doors, windows and curtain walls, frames of ladders, tent poles or pipes, antiglare shields, floors, sucker rods, telegraph poles and cross arms, guardrails, gratings, architectural sectional materials, container sectional materials and plates, bike racks, fishing rods, cable cores, insulator core rods, radomes, and single-layer or sandwiched continuous plates.

* * * * *